United States Patent [19]

Marchetti et al.

[11] 4,104,147

[45] Aug. 1, 1978

[54] PROCESS FOR CATIONIC ELECTRODEPOSITION OF AMINE ACID SALT-CONTAINING POLYMERS

[75] Inventors: Joseph R. Marchetti, Greensburg; Robert R. Zwack, New Kensington; Robert D. Jerabek, Glenshaw, all of Pa.

[73] Assignee: PPG Industries, Inc., Pittsburgh, Pa.

[21] Appl. No.: 788,706

[22] Filed: Apr. 19, 1977

Related U.S. Application Data

[60] Division of Ser. No. 648,982, Jan. 14, 1976, which is a continuation-in-part of Ser. No. 547,323, Feb. 5, 1975, Pat. No. 3,947,339, which is a continuation-in-part of Ser. No. 203,875, Dec. 1, 1971, abandoned.

[51] Int. Cl.$^2$ .............................................. C25D 13/06
[52] U.S. Cl. ................................................. 204/181 C
[58] Field of Search .................................... 204/181 C

[56] References Cited

U.S. PATENT DOCUMENTS

| 3,336,253 | 8/1967 | Wong et al. | 260/29.2 |
| 3,947,338 | 3/1976 | Jerabek et al. | 204/181 C |
| 3,962,499 | 6/1976 | Brody et al. | 427/386 |

*Primary Examiner*—Howard S. Williams
*Attorney, Agent, or Firm*—William J. Uhl

[57] ABSTRACT

Novel, chain-extended adducts formed from reacting high molecular weight polyepoxides and organic polyols containing at least two alcoholic, primary hydroxyls per molecule are disclosed. The chain-extended polyepoxides are adducted with a secondary amine and made dispersible in water with acid. The water-dispersed resins can be applied to a wide variety of substrates by cationic electrodeposition. When compared to resins which are not chain extended, the resins of the invention have higher rupture voltages, improved film-forming properties and deposit as films with improved flexibility.

15 Claims, No Drawings

PROCESS FOR CATIONIC ELECTRODEPOSITION OF AMINE ACID SALT-CONTAINING POLYMERS

BACKGROUND OF THE INVENTION

This is a division, of application Ser. No. 648,982, filed Jan. 14, 1976, which is a continuation-in-part of application Ser. No. 547,323, filed Feb. 5, 1975, now U.S. Pat. No. 3,947,339, which in turn is a continuation-in-part of application Ser. No. 203,875, filed Dec. 1, 1971, now abandoned.

Field of the Invention: This invention relates to resinous electrodepositable compositions which deposit on the cathode. More particularly, this invention relates to amine acid salt-containing resins prepared from polyepoxides.

Brief Description of the Prior Art: Cationic electrodepositable resinous compositions are known in the art. Thus, for example, U.S. Pat. No. 3,617,458 to Brockman discloses crosslinkable coating compositions which electrodeposit on the cathode. The coating compositions are derived from an unsaturated polymer containing amine groups and carboxylic acid groups and an epoxidized material. The compositions of Brockman differ from those of the present invention in that Brockman does not react the amine group with the epoxy group as is required by the present invention. Rather, in Brockman, the epoxy groups present are apparently esterified by the carboxyl groups, with the amine being subsequently acid-solubilized.

U.S. Pat. No. 3,663,389 to Koral et al discloses cationic electrodepositable compositions which are admixtures of certain aminealdehyde condensates and a variety of cationic resinous materials, one of which may be formed by reacting an organic polyepoxide with a secondary amine and solubilizing with acid. Notably missing from this reference is any teaching on chain extending the polyepoxides with organic polyols as is required by the present invention.

U.S. Pat. No. 3,640,926 to Slater et al discloses aqueous dispersions which electrodeposit on the cathode comprising an epoxy resin ester, water and a tertiary amine acid salt. The epoxy resin ester is the reaction product of a glycidyl polyether and a monobasic unsaturated oil acid and the amine salt is the reaction product of an aliphatic carboxylic acid with a tertiary amine. This reference differs from the present invention in that it lacks any disclosure on chain extending the polyepoxides with polyols as is required by the present invention. In fact, the epoxy esters of Slater et al contain no free epoxy groups indicating that esterification is stoichiometric leaving no opportunity for subsequent chain extension.

SUMMARY OF THE INVENTION

The present invention relates to improved cationic electrodepositable compositions and to a method of electrocoating an electrically conductive cathode with such compositions.

The compositions of the invention are novel adducts formed from chain extending high molecular weight polyepoxides having at least two epoxy groups per molecule. The chain extension is conducted with an organic polyol which may be monomeric or polymeric and contains at least two and preferably only two alcoholic primary hydroxyls in the molecule. The polyepoxide is adducted with a secondary amine and the adduct made dispersible in water with the aid of acid to provide cationic groups in the polymer.

Chain extension is usually accomplished in the presence of a tertiary amine catalyst. The catalyst may be added externally or alternately formed "in situ". In one embodiment of the invention, the polyepoxide is first adducted with secondary amine to form in situ the desired tertiary amine catalyst. This adduct is then chain extended with the organic polyol.

In one embodiment of the invention, the secondary amine used in adduct formations contains in part ketimine functionality obtained by blocking the primary amine groups of a polyamine which contains both primary and secondary amine groups.

In another embodiment of the invention, the cationic chainextended resin contains blocked isocyanate groups as part of the resin molecule or a fully blocked isocyanate is present with the resin being present as a separate component.

Chain extension of the polyepoxides has been found to increase rupture voltage of the composition on electrodeposition while at the same time enhancing film flow and coalescence, and in certain instances to increase the flexibility on the deposited film. Smoother films are obtained and deposition can be accomplished at lower bath temperatures.

It is important that the alcoholic hydroxyls be primary hydroxyls rather than secondary or tertiary hydroxyls. Primary hydroxyls are preferred because of the greater reactivity they exhibit towards epoxies than secondary or tertiary hydroxyls. Secondary hydroxyls are formed when polyepoxide is adducted with the secondary amine. The epoxide ring is opened and a tertiary amine and a secondary hydroxyl group are formed. The secondary hydroxyl is capable of further reacting with epoxy functionality to form an ether and another secondary hydroxyl. Thus, if reaction conditions are not controlled, the resin can react with itself to form a gel. Chain extending with a primary hydroxyl minimizes the tendency. The primary hydroxyls are more reactive towards epoxide functionality than secondary hydroxyls. Therefore, the epoxide will preferentially react with the primary hydroxyls in comparison to any secondary hydroxyls, thereby minimizing the tendency of the polyepoxide to react with itself and form a gel. Chain extending with polyols containing secondary and tertiary hydroxyls does not present such preferential reaction conditions. The polyepoxide is as likely to react with itself as with the chain extender, thereby creating greater possibility of gel formation.

Pertinent Prior Art

U.S. Pat. No. 3,839,252 to Bosso et al discloses quaternary ammonium salt-containing epoxy polymers which are reacted with polypropylene glycol.

DETAILED DESCRIPTION

The polyepoxide utilized to form the electrodepositable resins of the invention is a polymeric material containing two or more epoxy groups per molecule, and preferably two per molecule. The polyepoxides are of relatively high molecular weight having molecular weights of at least 350, preferably within the range of 350 to 2000. The polyepoxides can be essentially any of the well-known types such as polyglycidyl ethers of polyphenols, for example, bisphenols such as Bisphenol A. These can be produced by etherification of a polyphenol with epihalohydrin in the presence of alkali. The phenolic compound may be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxytertiarybutyl-phenyl)-2,2-propane, bis(2-hydroxynaphthyl)methane, 1,5-dihydroxynaphthalene, or the like. In many instances, it is desirable to employ such polyepoxides having higher molecular weights and containing aromatic groups. This can be provided by reacting the diglycidyl ether above with a polyphenol such as Bisphenol A, and then further reacting this product with epichlorohydrin to produce a polyglycidyl ether.

Another quite useful class of polyepoxides are polyglycidyl ethers of phenolic novolak resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane and the like.

There can also be used polyglycidyl esters of polycarboxylic acids.

The polyglycidyl ethers of polyphenols are the preferred polyepoxides for use in the practice of the present invention. Preferred polyglycidyl ethers of polyphenols have molecular weights of at least 350, preferably within the range of 350 to 2000, and epoxy equivalents within the range of 180 to 1000.

The polymeric polyepoxides described can be reacted with the organic polyols to chain extend and increase the molecular weight of the polymeric polyepoxides. The chain extender in effect acts as a chemical bridge between the lower molecular weight polymer chains bridging them together to produce advanced or higher molecular weight products. Usually bridging is done between terminal epoxy groups in the polymer chains. Reaction occurs by the alcoholic primary hydroxyls opening the epoxide ring forming an ether linkage and a secondary hydroxyl group.

In general, in the practice of preparing resins of the present invention which are suitable for use in electrodeposition, about 0.1 to about 0.8 equivalent of organic polyol per equivalent of epoxy group is usually used. Also, the production of essentially linear polymers is preferred. Thus, difunctional polyols should be used. Linear polymers are produced through reactions of diepoxides and difunctional organic polyols.

Chain extension is accomplished by admixing the organic polyol with the polyepoxide optionally in the presence of inert solvent, and conducting the reaction at a temperature of about 120° to 150° C. in the presence of a catalyst such as a tertiary amine. The tertiary amine catalyst can be added externally or can be formed "in situ" by first reacting a stoichiometric deficiency of a secondary amine with polyepoxide to form a tertiary amine-containing epoxy-containing adduct which can then be further reacted with the organic polyol to form a chain-extended reaction product. Examples of suitable tertiary amine externally added catalyst are benzyl dimethylamine, dimethylcyclohexylamine, dimethylethanolamine and triethylamine. Examples of suitable secondary amines for forming "in situ" tertiary amine catalyst are di- lower alkyl amines and hydroxyl-containing di- lower alkyl amines in which the alkyl group contains from 1 to 4 carbon atoms. Examples include dimethylamine and N-methyl ethanolamine. The amount of catalyst employed is usually about 0.2 to 1.0 percent by weight based on total weight of polyepoxide plus chain extender. Where "in situ" tertiary amine catalysts are formed, the percentage by weight is for the secondary amine precursor. Besides amines, other catalyst such as aluminum isopropoxide may be used.

The chain extenders are organic polyols containing at least two and preferably only two alcoholic primary hydroxyls. Mixtures of polyols can be used. Also, mixtures of polyols and mono primary alcohols can also be employed. Preferably, the average functionality of the polyol mixture is two and slightly lower.

The organic polyols can be either low or high molecular weight, and in general will have molecular weights of about 100 to 3000 and preferably of about 500 to 1000.

The polyols include low molecular weight diols, triols and higher polymeric polyols such as polyester polyols, polyether polyols of which the polyester polyols, particularly the polycaprolactone polyols, are preferred.

The low molecular weight diols, triols and higher alcohols useful in the instant invention are known in the art. Such materials include aliphatic polyols, particularly alkylene polyols containing from 2 to 18 carbon atoms. Examples include 1,6-hexanediol, 1,8-octanediol and cyclohexanedimethanol. Also useful are polyols containing ether linkages such as diethylene glycol, triethylene glycol and trimethylolpropane.

Examples of polymeric polyols include polyalkylene ether polyols and polyester polyols including hydroxyl-containing lactone polyesters.

Suitable polyalkylene ether polyols which may be used are those which have the following structural formula:

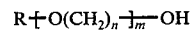

$$R + O(CH_2)_n +_m OH$$

where the substituent R is hydrogen or lower alkyl including mixed substituents, and $n$ is typically from 2 to 6 and $m$ is from 2 to 100 or even higher. Included are poly(oxytetramethylene) glycols, poly(oxyethylene) glycols.

The preferred polyalkylene ether polyols are poly-(oxytetramethylene) glycols having a molecular weight within the range of 500 to 3000.

The polyester polyols can also be used as a polymeric polyol component in the practice of the invention. The polyester polyols can be prepared by polyesterification of organic polycarboxylic acids or anhydrides thereof with organic polyols containing primary hydroxyls. Usually the polycarboxylic acids and polyols are aliphatic or aromatic dibasic acids and diols.

The diols which are usually employed in making the polyester include alkylene glycol, such as ethylene glycol and butylene glycol, neopentyl glycol and other glycols such as cyclohexanedimethanol.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and the like. Where acids are referred to above, it is understood that the anhydrides of those acids which form anhydrides can be used in place of the acid.

Besides polyester polyols formed from polybasic acids of polyols, lactone polyesters can also be employed. These products are formed from the reaction of a lactone such as epsilon-caprolactone with a polyol. Such products are described in U.S. Pat. No. 3,169,945 to Hostettler, the portion of this patent relating to the description of polycaprolactone polyols being incorporated by reference.

The polylactone polyols which are obtained from the above reaction are characterized by the presence of terminal hydroxyl groups and recurring polyester moieties derived from the lactone, that is,

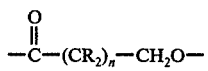

wherein $n$ is at least 4, and preferably from 4 to 6, and at least $n + 2R$ are hydrogen and the remaining R substituents are selected from the group consisting of hydrogen, alkyl, cycloalkyl, and alkoxy, none of the substituents contain more than 12 carbon atoms and the total number of carbon atoms in the substituents in the lactone ring does not exceed 12.

The lactone used as the starting material may be any lactone, or combination of lactones, having at least 6 carbon atoms, for example, from 6 to 8 carbon atoms in the ring and at least two hydrogen substituents on the carbon atom which is attached to the oxy group in the ring. The lactone used as the starting material can be represented by the following general formula:

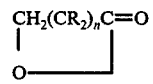

wherein $n$ and R have the meanings referred to above.

The lactones preferred in the practice of the invention are the epsilon-caprolactones in which $n$ equals 4 in the above structure. The most preferred is unsubstituted epsilon-caprolactone, in which $n$ equals 4 and all of the R's in the above structure are hydrogen. Epsilon-caprolactone is preferred because it is readily available in commercial quantities and gives excellent coating properties. Various lactones may be utilized individually or in combination.

Polymerization of the lactone is initiated by reaction with an organic polyol containing primary hydroxyls. Organic polyols which are preferred are aliphatic diols and triols such as alkylene diols containing from 2 to 10 carbon atoms.

Examples of suitable aliphatic diols include ethylene glycol, 1,3-propanediol, 1,4-butanediol, 1,5-pentanediol, 1,6-hexanediol, 1,10-decanediol and 1,4-cyclohexanedimethanol. Example of suitable aliphatic triol is trimethylolpropane. The preferred polycaprolactone polyols have molecular weights within the range of 530 to 2000.

Polycaprolactone polyols are preferred because they give superior coating compositions.

The reaction of the secondary amine, which may include additional ketimine group, with the polyepoxide takes place upon admixing the amine and the polyepoxide. Reaction occurs by the secondary amine opening the epoxide ring forming a tertiary amine and a secondary hydroxyl group. The amine-epoxy adduct is solubilized and attains its cationic character by further reaction with acid to form the tertiary amine acid salt.

Optionally, a solvent such as water-miscible ester, ether or ketone may be employed. The reaction may be exothermic and cooling may be desired. However, heating to a moderate temperature, that is, within the range of 50° to 150° C., may be used to hasten reaction. With ketimine modification, temperatures should not exceed 120° C. The amount of amine reacted with the epoxy group-containing material is at least that amount sufficient to render the resin cationic in character, that is, transportable to the cathode with subsequent acid solubilization.

The amine used is an organic secondary amine, usually a mono-secondary amine. Examples of such amines include di- lower alkyl amines and hydroxyl-containing di- lower alkyl amines in which the alkyl group contains 1 to 4 carbon atoms such as dimethylamine, diethylamine, dipropylamine, N-methyl ethanolamine, diethanolamine, and the like.

Mixtures of secondary amines with minor amounts of primary amines may be used. Care being taken to avoid gelation.

Part of the amine reacted with the polyepoxide can be a polyamine ketimine derivative. The ketimine derivative can be virtually any polyamine capable of reacting with an epoxy group having at least one secondary amine group and containing primary amine groups. The preferred polyamines are the alkylene polyamines and substituted alkylene polyamines. Especially preferred polyamines are selected from those having the following formula:

where R is a difunctional aliphatic group containing from about 2 to 28 carbon atoms. R may represent the same or different radicals in any one polyamine compound. Inert and non-interfering groups may be present on the group R.

Particularly preferred polyamines are those having the formula set forth above wherein R is an aliphatic hyrocarbon group. It is preferred that R be an alkylene group of 2 to 6 carbon atoms. Typical amines which may be used are diethylene triamine, triethylene tetramine, and so forth, and the corresponding propylene, butylene and higher alkylene amines. Other amines which may be employed include primary-secondary amines such as N-amino-ethyl piperizine.

The primary amine groups of the polyamine compounds are converted to ketimines by reaction with ketones. Such ketones have the following structural formula:

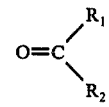

wherein $R_1$ and $R_2$ are organic radicals and are each substantially inert to the ketimine formation reaction. Preferably, $R_1$ and $R_2$ are short chain alkyl groups (1 to 4 carbon atoms). It is often preferred to use a ketone which boils below or near the boiling point of water or which readily distills with water. The reaction of the ketone with the primary amine groups can be illustrated as follows:

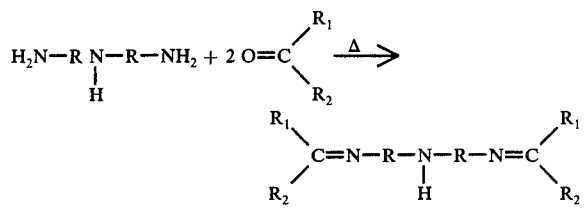

Preferred examples of ketones include acetone, methyl ethyl ketone, diethyl ketone, methyl propyl ketone, methyl isopropyl ketone, methyl n-butyl ketone, methyl isobutyl ketone, ethyl isopropyl ketone, cyclohexanone, cyclopentanone, acetophenone, and the like. Especially preferred ketones are acetone, methyl ethyl ketone and methyl isobutyl ketone.

Subsequent to the reaction, the resultant resin should not be exposed to conditions which would decompose the ketimine group to generate free primary amine groups until the possibility of gelation or crosslinking with the primary amine groups does not exist. The ketimine will decompose upon aqueous dispersion.

Coating compositions of the present invention may optionally include a crosslinking or curing agent to give harder, more corrosion resistant coatings. The preferred curing agents are capped isocyanate derivatives. In this instance, a tertiary amine acid salt-containing resin contains an active hydrogen group which is reactive with the polyisocyanate such as hydroxyl and primary amino hydrogen functionality. The polyisocyanates should be capped so they will not react with the active hydrogens in the coating composition until the coated article is heated to a high temperature sufficient to unblock the blocked isocyanate and cure the coating.

The capped or blocked isocyanates which may be employed in the compositions of the invention may be any isocyanate where the isocyanato groups have been reacted with a compound so that the resultant capped isocyanate is stable to active hydrogens at room temperature but reactive with active hydrogens at elevated temperature, usually between about 90° – 200° C.

In the preparation of the capped organic polyisocyanate, any suitable organic polyisocyanate may be used. Representative examples are aliphatic compounds such as trimethylene, tetramethylene, hexamethylene and butylidene diisocyanate; cycloalkylene compounds such as 1,4-cyclohexane diisocyanate; aromatic compounds such as p-phenylene diisocyanate; aliphaticaromatic compounds such as 4,4′-diphenylene methane diisocyanate, 2,4- or 2,6-tolylene diisocyanate or mixtures thereof. Higher polyisocyanates can be employed such as triisocyanates. Examples include triphenylmethane-4,4′,4″-triisocyanate and 2,4,6-triisocyanate toluene.

Any suitable aliphatic, cycloaliphatic, aromatic alkyl monoalcohol and phenolic compound may be used as a capping agent in accordance with the present invention, such as, for example, lower aliphatic alcohols containing from 1 to 4 carbon atoms, such as methanol, ethanol and n-butyl alcohol; cycloaliphatic alcohols such as cyclohexanol; aromatic-alkyl alcohols such as phenylcarbinol and methylphenylcarbinol; phenolic compounds such as phenol itself, substituted phenols in which the substituents do not adversely affect the coating operations. Examples include cresol, nitrophenol, chlorophenol and ethylphenol. Minor amounts of even higher molecular weight, relatively non-volatile monoalcohols may be used, if desired, to serve as plasticizers in the coatings provided by this invention.

Additional capping agents include oximes such as methyl ethyl ketoxime, acetone oxime and cyclohexanone oxime and lactams such as epsilon-caprolactam. Use of oximes and lactams is particularly desirable because the polyisocyanates blocked with these agents unblock and react at relatively low temperatures.

The reaction between the organic polyisocyanate and a capping agent is usually exothermic, therefore, the polyisocyanate and the capping agent are preferably admixed at temperatures no higher than 80° and preferably below 50° C. to minimize the exotherm effect.

The polyisocyanate curing agent can be used in two similar ways. The polyisocyanate can be fully capped, that is, no free isocyanate groups remain, and then added to the chain-extended, tertiary amine-containing polymer to form a two-component system. Or, the polyisocyanate can be partially capped, for example, half-capped diisocyanate so that the reactive isocyanate groups remain. The partially capped isocyanate can then be reacted with the polyepoxide through active hydrogen functionalities, i.e., hydroxyl, present in the polyepoxide under conditions which will not unblock the isocyanate. This reaction in effect fully caps the isocyanate making it a part of the polymer molecule and a one-component system.

Usually, the reaction of the semi-capped polyisocyanate and the active hydrogen functionality in the polyepoxide is conducted at low or moderate temperature which is generally about 150° C. or less to preserve the capped isocyanate groups in order to avoid gelation and to retain latent crosslinking sites. Solvent, particularly a water-miscible one such as an ether, ester or ketone, may be used. Usually the reaction is conducted in the presence of a catalyst for urethane formation at a temperature between about 60° and 120° C. Whether partially capped or fully capped, sufficient polyisocyanate is present in the coating system so that there are about 0.1 to about 1.0 urethane groups for each active hydrogen.

The order of reaction of the polyepoxide with polyol chain extender, amine and partially capped isocyanate is not particularly critical. Thus, the polyepoxide can be first adducted with the secondary amine and then chain extended. The amount of amine used may be only that necessary to establish an "in situ" tertiary amine catalyst for chain extension, followed by further reaction of the chain-extended polyepoxide with sufficient amine required for water solubilization and giving the resin sufficient cationic character necessary for electrodeposition. Alternately, the polyepoxide may be reacted with all the required amine, followed by chain extension. In both embodiments a stoichiometric deficiency of amine to epoxy is employed to insure there will be sufficient epoxy groups available for chain extension.

In general, to impart sufficient cationic character to the polyepoxide for electrodeposition, the milliequivalent of neutralizable nitrogen per gram of total resin solids preferably should be maintained between 0.3 to 3.

When the amine contains a ketimine modification, it is preferred that chain extension be accomplished before adduction of the polyepoxide with the amine-containing ketimine in order to minimize any ketimine dissociation.

Modifying the polyepoxides with partially blocked polyisocyanates can occur either before or after amine adduction and chain extension. If conducted after amine adduction, care should be taken with reaction conditions, particularly temperature, so as not to decompose the ketimine.

The resinous products of the invention can be epoxy-containing or epoxy-free depending on the stoichiometry employed in amine adduction and chain extension. When ketimine is employed and when the resinous products are dispersed in water, any unreacted epoxy functionality will react with primary amine functionality generated by hydrolysis of the ketimine.

Aqueous dispersions of the above-described resinous products are highly useful as coating compositions, particularly suited to application by electrodeposition, although they may also be applied by conventional coating techniques. For dispersion in water, the resinous products are neutralized to provide cationic groups, e.g., tertiary amine acid salt groups and when ketimine is employed neutralized primary amine groups generated by hydrolysis of the ketimine in the resin.

Neutralization of the products is accomplished by reaction of all or part of the amino groups by water-soluble acid, for example, formic acid, acetic acid, phosphoric acid or the like. The extent of neutralization depends upon the particular resin and it is only necessary that sufficient acid be added to disperse the resin.

The term "dispersion" as used within the context of the present invention is believed to be a two-phase translucent or opaque aqueous resinous system in which the resin is the dispersed phase and water the continuous phase. The average particle size diameter of the resinous phase is generally less than 10 and preferably less than 5 microns. Particles may be spherical or elongated or invisible by microscopic investigation. The term "dispersion" is also intended to cover homogeneous aqueous solutions which appear optically clear.

The concentration of the resinous products in the aqueous medium depends upon the process parameters to be used and is, in general, not critical, but ordinarily the major portion of the aqueous dispersion is water. For example, the aqueous dispersion may contain from about 5 to 50 percent by weight resin solids.

Besides water, the aqueous medium may contain a coalescing solvent. The use of coalescing solvents provides in some instances for improved deposited film appearance. These solvents include hydrocarbons, alcohols, esters, ethers, and ketones. The preferred coalescing solvents include monoalcohols, glycols and polyols as well as ketones and ether alcohols. Specific coalescing solvents include isopropanol, butanol, isophorone, 4-methoxy-methylpentanone-2, ethylene and propylene glycol, the monoethyl, monobutyl and monohexyl ethers of ethylene glycol and 2-ethyl hexanol. The amount of coalescing solvent is not unduly critical and generally is between about 0.1 and 40 percent by weight, preferably about 0.5 to about 25 percent by weight based on total weight of the aqueous medium.

In most instances, a pigment composition and, if desired, various additives such as surfactants or wetting agents are included in the dispersion. The pigment compositions may be of any conventional type, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as pigment-to-resin ratio. In the practice of the present invention, pigment-to-resin ratios within the range of 0.01 to 5:1 are usually used. The other additives mentioned immediately above are present in the dispersion in amounts of about 0.01 to 3 percent by weight based on total weight or resin solids.

In the electrodeposition process employing the aqueous dispersion described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which electrodeposition is carried out are, in general, similar to those used in electrodeposition of other types of coatings. The applied voltage may be varied greatly and can be, for example, as low as one volt or as high as several thousand volts, but typically between about 50 and 500 volts. The current density is usually between 1.0 ampere and 15 amperes per square foot, and tends to decrease during electrodeposition, indicating the formation of a self-insulating film.

It is desirable to electrodeposit these coatings from a dispersion having a pH between 3 and about 9.

The method of the invention is applicable to coating of any conductive substrate, especially metals such as steel, aluminum, copper, magnesium or the like. After electrodeposition, the coating is cured, usually by baking at elevated temperatures. Temperatures of from about 90° to 260° C. for about 1 to 30 minutes are typical.

It is sometimes necessary with the blocked isocyanate, in order to insure rapid and complete cure, to have present in the coating a catalyst for urethane formation. The amount of catalyst employed is that amount which effectively promotes reaction in the deposited film; for example, amounts varying from about 0.05 percent to about 4 percent by weight based on total resin solids may be employed. Typically, about 2 percent by weight are employed. However, if curing temperatures after deposition are high enough, catalyst may not be needed. Also, if a proper blocking agent for the isocyanate is employed, for example, oximes and phenols, catalyst may not be needed.

EXAMPLE I

One thousand and sixteen parts of EPON 1001 which is the polyglycidyl ether of Bisphenol A having an epoxy equivalent weight of 508 and commercially available from Shell Chemical Company were charged into a reactor with 510 parts by weight of polytetramethylene glycol possessing a molecular weight of 1020 and commercially available from Quaker Oats Company as POLYMEG 1020, and 83.8 parts of diethylene glycol diethyl ether. The charge was heated to 60° C. with agitation and 65.9 parts of diethylamine introduced. The batch was then heated to 155°–160° C. and held for approximately 10 hours for chain extension. At this point, the reaction mixture was cooled to 130° C. and thinned with 197.1 parts by weight of ethylene glycol monoethyl ether.

In another reactor a polyurethane crosslinker was prepared by adding 218 parts by weight of 2-ethyl hexanol slowly to 291 parts by weight of an 80/20 isomer mixture of 2,4-/2,6-toluene diisocyanate under agitation and a dry nitrogen blanket, keeping the reaction temperature under 100° F. (38° C.) by external cooling. The charge was held an additional one-half hour at 100° F. (38° C.) and then heated to 140° F. (60° C.) at which point 75 parts by weight of trimethylolpropane were added followed by 0.08 parts of dibutyltin dilaurate catalyst. After an initial exotherm, the batch was held at 250° F. (121° C.) for 1½ hours until essentially all of the isocyanate moiety was consumed as indicated by infrared scan. The batch was then thinned with 249 parts of ethylene glycol monoethyl ether.

A cationic pigment dispersion was manufactured by first preparing a dispersant by blending 138 parts of alkyl imidazoline (Geigy Amine C), 31 parts of glacial acetic acid, 138 parts of ethylene glycol monobutyl ether, and 383 parts of deionized water. One hundred parts of this dispersant were mixed with 40 parts of acetylenic alcohol commercially available from Air Products and Chemicals Inc. As SURFYNOL 104A, 260 parts of deionized water, 134 parts of 325 mesh anthracite coal, 40 parts of lead silicate, 20 parts of strontium chromate and 6 parts of clay commercially available from National Clay as BENAGEL EW. The resultant slurry was then ground to a Hegman No. 7 fineness reading in a suitable mill.

To prepare the chain extended, electrodepositable thermosetting cationic urethane modified composition, 275 parts of the polytetramethylene glycol chain extended polyether vehicle were blended with 217 parts of a polyurethane crosslinker, and 7.6 parts of dibutyltin dilaurate catalyst, followed by neutralization with 12.9 parts of glacial acetic acid, and reduction with 57 parts of n-butyl alcohol and 458.1 parts of deionized water. To this solubilized vehicle composition was then added 285 parts of the pigment dispersion followed by 1905.4 parts of deionized water to let down the composition to coating solids. This electrodeposition bath showed a pH of 5.6, had a rupture voltage of 320 volts and yielded smooth, hard, flexible films of 0.45 mil thickness when cathodically electrodeposited over zinc phosphated steel panels at 280 volts for 2 minutes and cured for 20 minutes at 400° F. (204° C.).

EXAMPLE II

Into a suitable reactor were charged 970 parts by weight of EPON 1001 having an epoxy equivalent weight of 485 and 265 parts by weight of a polycaprolactone diol sold commercially by Union Carbide Corporation under the trade name of PCP 0200. This particular product was believed to be made by ring opening epsilon-caprolactone with ethylene glycol to produce a polymer product having a molecular weight of approximately 543. This charge was heated to 100° C. under a nitrogen blanket and 0.46 parts of benzyl dimethylamine added. The reaction mixture was heated further to 130° C. where it was held for about 1½ hours. The batch was then cooled to 110° C. and 110 parts by weight of methyl isobutyl ketone was introduced into the reaction vessel followed by 39.8 parts by weight of a 73 percent non-volatile solution of methyl isobutyl diketimine of diethylene triamine in methyl isobutyl ketone solvent followed by an additional 100 parts by weight of methyl isobutyl ketone. Cooling was continued until the batch reached 70° C. at which point 53.1 parts by weight of diethylamine were introduced and the batch reheated to 120° C. where it was held for 3 hours and then discharged.

To prepare the chain extended electrodepositable thermosetting cationic urethane modified composition, 576 parts of the above-described polycaprolactone diol chain extended polyether was blended with 310 parts by weight of the polyurethane crosslinker of Example I and 13.2 parts of dibutyltin dilaurate catalyst followed by neutralization with 12.3 parts of glacial acetic acid and reduction slowly with 705.5 parts of deionized water. To this solubilized vehicle composition was then added 297 parts of the pigment dispersion of Example I, 39 parts of ethylene glycol monohexyl ether followed by 1886 parts of deionized water to let down the composition to a coating solids of about 10 percent by weight.

This electrodeposition bath showed a pH of 6.1, had a rupture voltage of 390 volts and yielded smooth, hard, flexible films of approximately 0.7 mil film thickness when cathodically electrodeposited over an untreated steel panel at 340 volts for 2 minutes and cured for 20 minutes at 400° F. (204° C.). When scribed and exposed to a salt fog at 100° F. (38° C.) as described in ASTM D-117-73, the panel displayed only 1/32 inch scribe creepage from the scribe mark after 14 days.

EXAMPLE III

Into a suitable reactor were charged 1108 parts by weight of EPON 1001 having an epoxy equivalent of 534 plus 637 parts by weight of a polycaprolactone diol sold commercially by Union Carbide Corporation as PCP 0230. This particular product was believed to be formed by ring opening epsilon-caprolactone with diethylene glycol to produce a polymer having a molecular weight of approximately 1250. This charge was heated to 60° C. at which point 62 parts of diethylamine were added, followed by heating the reaction mixture to 130° C. under a nitrogen blanket and holding at this temperature for 3½ hours at which point 200 parts of methyl isobutyl ketone were added, the reaction mass heated to 140° C. during which time 20 parts of the volatiles were stripped off. The reaction mixture was cooled to 130° C. and 584.5 parts of methyl isobutyl ketone added. Cooling was continued to 90° C. followed by the addition of 39.8 parts of methyl isobutyl diketimine of diethylene triamine having a solids content of 73 percent in methyl isobutyl ketone. The reaction mass was heated to 130° C. and held for 2½ hours while stripping off 320.9 parts of volatiles. The mixture was cooled to 100° C. at which point 9 grams of water were added and the mixture held at 100° C. for 10 minutes before discharging.

To prepare the chain-extended electrodepositable thermosetting cationic urethane modified composition, 318 parts of the above-described polycaprolactone diol chain extended polyether were blended with 178 parts of the polyurethane crosslinker of Example I and 7.6 parts of dibutyltin dilaurate catalyst and 5.7 parts of glacial acetic acid. After slow reduction with 206.7 parts of deionized water, 171 parts of the pigment dispersion of Example I were added followed by further reduction with 286.9 parts of deionized water.

This electrodeposition bath showed a pH of 6.1, had a rupture voltage of 370 volts and yielded smooth, hard, flexible films of 0.6 mil when zinc phosphated steel panels were electrodeposited at 300 volts for 2 minutes and cured for 20 minutes at 400° F. (204° C.). When exposed to salt fog at 100° F. (38° C.) according to ASTM D-117-73, the panel displayed only 1/32 of an inch creepage from the scribe mark after 14 days.

EXAMPLE IV

Into a suitable reactor were charged 975.6 parts by weight of EPON 1004 which is a polyglycidyl ether of Bisphenol A and epichlorohydrin having an epoxy equivalent of 975.6 and commercially available from Shell Chemical Company, plus 489.6 parts of polycaprolactone diol sold commercially by Union Carbide Corporation as PCP 0240 plus 257.6 parts by weight of methyl isobutyl ketone. The PCP 0240 is believed to be prepared by ring opening epsilon-caprolactone with diethylene glycol to produce a polymer having a molecular weight of approximately 2000. The mixture was heated to 135° C. and held for 38 minutes while stripping off the dissolved water. The reaction mixture was then cooled to 55° C. at which point 21.6 parts of diethylamine were added followed by reheating to 130°–134° C. and holding for 3 hours. The reaction product was then allowed to cool overnight.

The following morning there was added 79.6 parts of methyl isobutyl diketimine of diethylene triamine as a 70 percent solids solution in methyl isobutyl ketone. The mixture was heated to 135° C. and held for 9 hours at which point 379.6 parts of methyl isobutyl ketone were added followed by 7 parts of deionized water and holding the reaction mass at 125° C. for 2½ hours. To prepare the chain-extended electrodepositable thermosetting cationic urethane modified composition, 383 parts of the above polycaprolactone diol extended polyether were blended with 178 parts of the polyurethane crosslinker of Example I, 7.6 parts of dibutyltin dilaurate catalyst, and 7.2 parts by weight of glacial acetic acid. After slow reduction with 184.2 parts of deionized water, 171 parts of the pigment dispersion of Example I was added followed by further reduction with 2869 parts of deionized water.

This electrodeposition bath showed a pH of 6.0, a rupture voltage of 380 volts and yielded smooth, hard, flexible films of 0.7 mil when untreated steel panels were electrodeposited at 330 volts for 2 minutes at 88° F. (31° C.) and cured for 20 minutes at 400° F. (204° C.).

EXAMPLE V

The 2-ethyl hexanol monourethane of 2,4-toluene diisocyanate was prepared by adding 1953 parts of 2-ethyl hexanol to 2610 parts of 2,4-toluene diisocyanate and 200 parts of methyl butyl ketone over a 5-hour period with agitation and external cooling to maintain the batch reaction temperature below 20° C. The batch was then thinned with 100 parts of methyl butyl ketone and stored under dry nitrogen.

In another reactor, 576 parts of EPON 828, 118 parts of 1,6-hexanediol and 50 parts of toluene were charged. EPON 828 is the polyglycidyl ether of Bisphenol A having an epoxy equivalent of about 192 and is commercially available from Shell Chemical Company. The mixture was heated to its reflux temperature of 165° C. and held for one hour. After cooling to 100° C., 15 parts of a catalyst solution of 23.8 percent aluminum isopropoxide in benzene were added and the reaction mixture was reheated to 180° C. and held for 135 minutes.

Six hundred fifty-three parts of the above hexanediol chain-extended diglycidyl ether were charged into a new reactor along with 174.5 parts of methyl butyl ketone, and the mixture heated to 100° C. Four hundred thirty-eight parts of the previously prepared monourethane plus 22 drops of dibutyltin dilaurate were added to the reaction mixture, and the mixture heated to 120° C. and held for 50 minutes, at which point all isocyanate was essentially consumed as indicated by an infrared scan. The reaction mixture was then cooled to 110° C. at which time 77.5 parts of diethylamine and 27 parts of the methyl isobutyl ketone diketimine of diethylene triamine were added. The reaction mixture was then heated to 120° C. and held for 65 minutes.

Twelve hundred parts of the above resin were dispersed by pouring hot from the reactor into an agitated solution of 87 parts of 88 percent lactic acid and 1588 parts deionized water.

A cationic pigment dispersant was prepared by heating a mixture of 744.2 parts of stearyl glycidyl ether (Proctor and Gamble's EPOXIDE 45) and 156.6 parts of ethylene glycol monobutyl ether to about 70° C. and then adding 150.2 parts of n-methyl ethanolamine over a 25-minute period with external cooling to keep the bath temperature below 85° C. Ten more parts of ethylene glycol monobutyl ether were then added and the reaction mixture was heated to 140° C. and held for 30 minutes. One hundred eighty-eight parts of this dispersant were then solubilized by blending with 132 parts of ethylene glycol monobutyl ether, 40 parts of 88 percent lactic acid and 440 parts deionized water.

To prepare a pigment paste, 90 parts of a catonic pigment dispersant prepared as described above were blended with 4 parts of acetylenic alcohol defoamer (SURFYNOL 104A), 306 parts of deionized water, 46.4 parts of phthalocyanine blue pigment, 108.6 parts brown iron oxide pigment, 30 parts of lead silicate and 15 parts of strontium chromate and the resultant slurry was ground in a suitable mill.

To prepare the chain-extended, electrodepositable thermosetting cationic urethane modified composition, 952 parts of the dispersed 1,6-hexanediol chain extended polyether vehicle were further reduced with 7.4 parts dibutyltin dilaurate, 228 parts of pigment paste and 2613 parts of deionized water. This electrodeposition bath had a rupture voltage of 380 volts and yielded smooth, hard, flexible films of 0.5 mil thickness when cathodically electrodeposited over zinc phosphated steel at 300 volts for 2 minutes and cured for 20 minutes at 400° F. (204° C.).

EXAMPLE VI

Into a suitable reactor were charged 1108 parts by weight of EPON 1001 having an epoxy equivalent weight of 554, plus 122 parts of methyl isobutyl ketone. The reaction mixture was heated to 190° C. and 73.3 parts of volatiles were removed by distillation. After cooling to 110° C., there was added 369.3 parts of the 2-ethyl hexanol monourethane of 2,4-toluene diisocyanate prepared as described in Example V above. The reaction mixture was heated to 120° C. and held for one hour at which time there was added 265 parts of polycaprolactone diol commercially available from Union Carbide Corporation as PCP 0200 and 0.92 parts benzyl dimethylamine catalyst. The reaction mixture was then heated to 130° C. and held for 4 hours at which time there were added 525.4 parts of methyl isobutyl ketone. The reaction mixture was cooled to 70° C. and 39.8 parts of a 73 percent by weight solution in methyl isobutyl ketone of a methyl isobutyl ketone diketimine of diethylene triamine were added, followed by 62 parts of diethylamine.

The reaction mixture was then heated to 115° C. and held for 4 hours at which point 11.8 parts of diamyl amine were added and the reaction mixture held for another 2 hours.

To prepare the chain-extended electrodepositable thermosetting cationic urethane modified composition, 518 parts of the above polycaprolactone diol extended polyurethane resin were blended with 7.6 parts of dibutyltin dilaurate and 9.3 parts of glacial acetic acid, followed by careful reduction with 225.1 parts of deionized water. To this solubilized vehicle composition was then added 171 parts of the pigment dispersion of Example I, 19 parts of ethylene glycol monohexyl ether and 2869 parts of deionized water. This electrodeposition bath had a rupture voltage of 300 volts, pH of 5.8 and yielded smooth, hard, flexible films when cathodically electrodeposited over zinc phosphated steel at 270 volts for 2 minutes and cured for 20 minutes at 400° F. (204° C.). When scribed and exposed to a salt fog at 100° F. (38° C.) as described in ASTM D-117-73, the panel displayed less than 1/32 inch scribe creepage from the scribe mark after 14 days.

We claim:

1. An improved method for coating a conductive substrate serving as a cathode, which method comprises passing electric current between an anode and said cathode in electrical contact with the water dispersion of a resinous composition, the improvement wherein the resinous composition comprises the reaction product of:
   (A) a polyepoxide having a molecular weight of at least 350,
   (B) a secondary amine,
   (C) a polyester polyol containing at least two alcoholic, primary hydroxyl groups, said polyester polyol being selected from the class consisting of polylactones and polyesters prepared by polyesterification of organic polycarboxylic acids or anhydrides thereof with organic polyols; said reaction product being dispersible in water with the aid of an acid to provide cationic groups in the resin.

2. The method of claim 1 in which the reaction is conducted in the presence of an added tertiary amine catalyst.

3. The method of claim 1 in which the polyepoxide is first reacted with the secondary amine in a stoichiometric deficiency so as to form a tertiary amine-containing, epoxy-containing adduct which is then further reacted with said polyester polyol to form a chain-extended reaction product.

4. The method of claim 1 in which the polyepoxide is a polyglycidyl ether of a polyphenol having a molecular weight within the range of from about 350 to 2000.

5. The method of claim 4 in which the polyglycidyl ether of the polyphenol is a polyglycidyl ether of a bisphenol having an epoxy equivalent of from about 180 to 1000.

6. The method of claim 1 in which the secondary amine is a dialkyl amine in which the alkyl groups are the same or different and contain from 1 to 4 carbon atoms.

7. The method of claim 6 in which the dialkyl amine is a hydroxyalkyl-containing amine.

8. The method of claim 1 in which the polyester polyol is a polycaprolactone polyol having a molecular weight within the range of 530 to 2000.

9. The method of claim 8 in which the polycaprolactone polyol is formed from ring opening epsilon-caprolactone with ethylene glycol.

10. The method of claim 8 in which the polyamine derivative is a diketimine derived from one mole of diethylene triamine and two moles of methyl isobutyl ketone.

11. The method of claim 1 in which the secondary amine contains a polyamine derivative having at least one ketimine group.

12. The method of claim 1 which contains in the resin molecule active hydrogens and blocked isocyanate groups which are stable at room temperature but are reactive with said active hydrogens at elevated temperature.

13. The method of claim 12 wherein the isocyanate groups and the active hydrogens are present in an equivalent ratio of about 0.1 to 1 blocked isocyanate group for each active hydrogen.

14. The method of claim 1 which contains active hydrogens, said resin taken in further combination with a fully blocked polyisocyanate stable at ordinary room temperature in the presence of said active hydrogen-containing resin but reactive with the active hydrogens of said resin at elevated temperature.

15. The method of claim 14 wherein the isocyanate groups and the active hydrogens are present in an equivalent ratio of about 0.1 to 1 blocked isocyanate group for each active hydrogen.

* * * * *

UNITED STATES PATENT AND TRADEMARK OFFICE
CERTIFICATE OF CORRECTION

PATENT NO. : 4,104,147

DATED : August 1, 1978

INVENTOR(S) : Joseph R. Marchetti, Robert R. Zwack and Robert D. Jerabek

It is certified that error appears in the above-identified patent and that said Letters Patent are hereby corrected as shown below:

Column 1, line 34, "aminealdehyde" should be --amine-aldehyde--.

Column 2, line 16, "chainextended" should be --chain-extended--; and line 24, "on" should be --of--.

Column 3, line 66, "dimethylamine" should be --diethylamine--.

Column 7, lines 49-50, "aliphaticaromatic" should be --aliphatic-aromatic--.

Signed and Sealed this

Sixteenth Day of January 1979

[SEAL]

Attest:

RUTH C. MASON
*Attesting Officer*

DONALD W. BANNER
*Commissioner of Patents and Trademarks*